United States Patent
Yan et al.

(10) Patent No.: US 8,901,774 B2
(45) Date of Patent: Dec. 2, 2014

(54) DISTRIBUTED POWER SUPPLY SYSTEM WITH DIGITAL POWER MANAGER PROVIDING DIGITAL CLOSED-LOOP POWER CONTROL

(75) Inventors: Jiajia Yan, Zhejiang (CN); Yuanping Zhou, Zhejiang (CN); Huajun Jian, Zhejiang (CN); Mark Jutras, Upton, MA (US)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 937 days.

(21) Appl. No.: 13/044,965

(22) Filed: Mar. 10, 2011

(65) Prior Publication Data

US 2011/0234000 A1 Sep. 29, 2011

(30) Foreign Application Priority Data

Mar. 23, 2010 (CN) .......................... 2010 1 0132452

(51) Int. Cl.
| | |
|---|---|
| H02J 3/14 | (2006.01) |
| H02J 1/00 | (2006.01) |
| H02J 3/00 | (2006.01) |
| H02M 3/157 | (2006.01) |
| H02M 1/00 | (2006.01) |

(52) U.S. Cl.
CPC ........ H02M 3/157 (2013.01); *H02M 2001/008* (2013.01)
USPC ................................ 307/82; 307/31

(58) Field of Classification Search
CPC .................. H02M 3/157; H02M 2001/008
See application file for complete search history.

(56) References Cited

U.S. PATENT DOCUMENTS

| 7,000,125 | B2 | 2/2006 | Chapuis et al. | |
|---|---|---|---|---|
| 7,394,445 | B2 | 7/2008 | Chapuis et al. | |
| 2008/0238393 | A1* | 10/2008 | Potter et al. | 323/283 |
| 2011/0304206 | A1* | 12/2011 | Potter et al. | 307/31 |

FOREIGN PATENT DOCUMENTS

| CN | 101124619 A | 2/2008 |
|---|---|---|
| CN | 101656431 A | 2/2010 |

* cited by examiner

*Primary Examiner* — Jared Fureman
*Assistant Examiner* — Aqeel Bukhari
(74) *Attorney, Agent, or Firm* — BainwoodHuang

(57) ABSTRACT

A power supply system includes a digital power manager and multiple power blocks each conveying regulated power to a respective load. The power blocks include the power part of non-isolated DC/DC converters, signal sampling and conversion circuits to provide analog voltage signal representing output voltage, output current, temperature, etc., and driving circuits to receive pulse width modulation (PWM) signals and drive switching devices. Closed-loop voltage control and protection functions for the power blocks are integrated into the digital power. The digital power manager includes a non-volatile memory containing registers, including a digital power manager configuration register, a power block set-up register, and a power block monitor register, as well as a user-definable space. The digital power manager programs and monitors operation of each power block, and may also include a user interface, such as an I2C interface, for receiving programming data from a host user system and send monitoring data thereto.

20 Claims, 13 Drawing Sheets

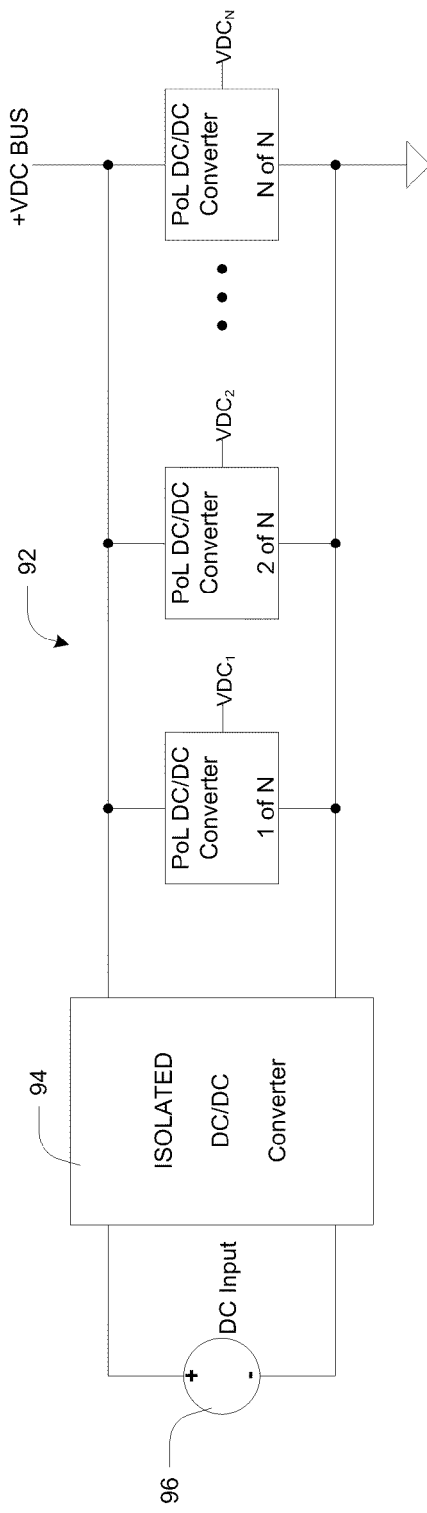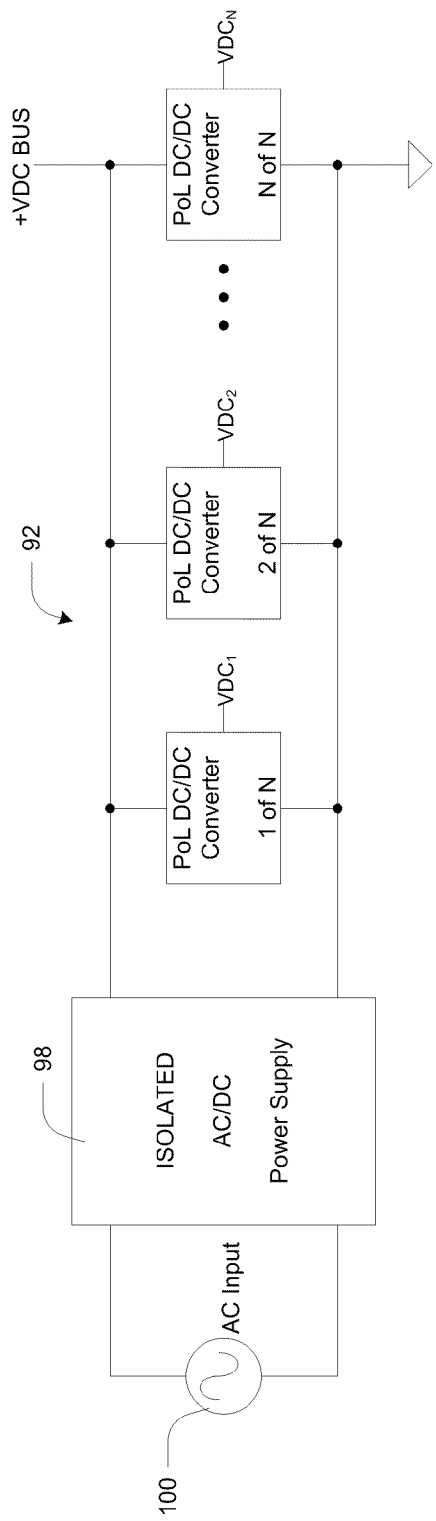
Fig. 14A
Fig. 14B

DISTRIBUTED POWER SUPPLY SYSTEM WITH DIGITAL POWER MANAGER PROVIDING DIGITAL CLOSED-LOOP POWER CONTROL

BACKGROUND

The present invention relates to management of a distributed power supply system, and more particularly to the control and monitoring of an array of point-of-load regulators or other non-isolated DC-DC converters within a distributed power supply system.

With the development of the electronic and communication technology, the power supply system is becoming more complex. As a result, the requirements of power density and reliability of the power supply system are getting higher as well. It is common for an electronic system to require several different relatively low voltage levels, such as 3.3V, 2.5V, 1.8V, 1.2V, etc., and the voltage should be regulated precisely. At the same time, relatively high current levels (e.g., 100 A) and high current changing rates (e.g., 1000 A/μs) are also required. It's not a good way to deliver such a high current to electronic devices over a long distance, because the impedance of the lines carrying the high current tends to dissipate a large part of power and deteriorate the load regulation. So, the physical distance between the power supply and its load should be as short as possible to avoid significant power loss and to make sure of the system stability. That means the traditional multi-output power supplies which are not close enough to different loads can't satisfy the requirements.

In order to solve the problems above, at present the distributed power supply system with an intermediate bus configuration is widely used. This system comprises two stages. In the first stage, the AC input voltage for the whole system is rectified, then converted to the intermediate bus voltage level (the typical value is 8-12V), and electrical isolation is also realized in this stage. There are multiple non-isolated point-of-load (POL) regulators in the second stage, and each of them converts the intermediate bus voltage to each of the multiple levels required by the electronic system. This configuration that each relatively low power POL regulator is located close to a particular electronic device will help improve the system efficiency and reliability.

A typical distributed power supply system includes multiple POL regulators. With this approach, the management of these POL regulators becomes very important. There is a need to control and monitor different operating parameters accurately, and diagnose fault conditions quickly of every POL regulator to get excellent performance of the whole distributed power supply system. At present, there are mainly three kinds of manager to control the POL regulators in the distributed system: analog controller, digital power system sequencer and multi-digital controllers.

In a conventional power supply system, all POL regulators are controlled by analog control methods. Analog control is a very mature technology and has relatively low cost, and therefore it has wide applications in distributed power supply system architectures. One drawback of an analog control system is that it is difficult for a host computer to get the working status of each POL regulator and to realize on-line control.

In order to make up for the shortcomings of conventional analog control, a control configuration which includes a digital signal processor (DSP) or micro control unit (MCU) based digital power system sequencer is utilized. In this approach, the POL regulators closed-loop voltage control is also implemented by analog devices, and a host computer manages all POL regulators through the digital power system sequencer. The instructions transmitted from the host computer to program POL regulators operating parameters and the monitoring data sent from the digital power system sequencer are all transferred via the power management bus (PMBus) which is based on the PMBus protocol—an open standard communication protocol. The digital power system sequencer is capable of sensing the output voltage, controlling the ON/OFF state, and sequencing and margining the output voltage of each POL regulator via various kinds of peripherals integrated on the DSP/MCU. The digital power system sequencer further comprises a PMBus interface adapted to communicate with the host computer. The number of POL regulators can be managed depends on the amount of the peripherals integrated on the DSP/MCU. Although the on-line management is implemented, the closed-loop voltage control is not flexible because of the analog closed-loop voltage control.

With the increasing calculation speed of the DSP/MCU, a kind of distributed power supply system with multiple digital controllers is also used. In this system, each of the multiple digital controllers is responsible to each of the multiple POL regulators for individual closed-loop control and various protections, and furthermore, as a slave device, each digital controller can have bidirectional communication with the host computer. This control implementation has on-line management functions similar to the above-described approach, and it also improves the system design flexibility. However, for every POL regulator a corresponding digital controller is required with adequate integrated peripherals and communication interfaces. Overall system cost may be high, and the communication efficiency may be low due to too many devices in the system.

Thus, it would be advantageous to have a management system and method for controlling and monitoring power converters within a distributed power supply system.

SUMMARY

The invention overcomes these and other disadvantages of the prior art by providing a digital power manager adapted to control and monitor a plurality of power converters in a distributed power supply system.

In an embodiment of the invention, the power supply system comprises a plurality of power blocks adapted to deliver power to the loads, and a digital signal processor (DSP) or micro control unit (MCU) based digital power manager adapted to realize individual digital closed-loop control, execute instructions to program operating parameters and monitor the conditions of the plurality of power blocks. In this invention, the power block, namely, only the power part of the conventional non-isolated DC/DC converter, would be implemented in different manners, e.g., point-of-load (POL) regulator and voltage regulator module (VRM). Inherently, there is no closed-loop control or protection function within the power block which only provides relevant analog voltage signals to represent output voltage, output current, module temperature and so on. Therefore, the digital power manager is necessary for closed-loop controlling, monitoring and protecting the plurality of power blocks.

In this control system implementation, the calculation capability and the peripheral resources of the digital power manager are made full use of, so as to integrate the closed-loop voltage control of each of the multiple power blocks into the digital power manager. As a result, there is no requirement for a separate analog/digital controller for each power converter as in prior systems, which means decreasing cost of the overall electronic system. Additionally, the control design would be more flexible due to the digital implementation. In a further embodiment of the invention, at least one host user system is operatively coupled to the digital power manager. The host user system would control and monitor the power blocks operation and get failure reports via the digital power manager, so better system performance is achieved with lower cost than the prior art.

The main characteristics of this digital management are as follows.

1. Power Block

The topology of the non-isolated power block can be buck, boost, buck-boost and so forth. Besides the power conversion circuits and devices, the power block includes signal sampling and conversion circuits which can sample the output voltage, output current, module temperature, etc. and convert them into analog voltage signals to afford to the external controller. On the other hand, driving circuits in the power block receive pulse width modulation (PWM) signals from the external controller to get power block closed-loop voltage control and various protections. The power block itself doesn't include closed-loop control and protection circuits to lower the cost. Control connections to each power block are made directly to the controller without the use of serial digital communication. This further simplifies the design of the power block keeping its relative cost low compared to other methods. Another advantage of not using serial communication to the power blocks is the elimination of possible communication errors and increased control bandwidth.

2. Digital Closed-Loop Control

The digital closed-loop control for multiple power blocks has been integrated into the digital power manager. For each power block, an analog signal which presents the output voltage of the power block is input into the digital power manager via an analog-to-digital converter (ADC) channel. The digitized sensed output voltage is compared to the digital reference value stored in the non-volatile memory to get the error value. This error value which is processed with the control algorithm will adjust the duty cycle generated from the digital pulse width modulator (DPWM). Furthermore, if closed-loop current control and/or closed-loop power control is required, then not only the error value mentioned above but also a digitized sensed average/peak output current of the power block would be processed together to adjust the duty cycle. The digital closed-loop control algorithm is designed to make the output voltage track the reference and at the same time achieve the desired dynamic performance. Every power block would have individual digital reference and closed-loop compensation parameters. The nonlinear or asynchronous control algorithm, which is hard to realize using analog devices, can be employed with digital compensation to improve system performance. Additionally, the digital closed-loop control is relatively immune from the components tolerances, aging, temperature drift, and so on.

3. Output Voltage Management

Using digital closed-loop control, the power blocks are under precise output voltage control beginning at start up. Thus, the power blocks on/off sequencing can be easily controlled by setting associated digital references for soft start/shut down sequencing. In addition, the output voltage can be easily trimmed as well by changing the digital reference.

4. Fault Detection and Reporting

The digital power manager can query the key operating parameters (such as output voltage, output current, input voltage, module temperature, etc.) of the power blocks circularly at different frequencies according to the system performance sensitivity to different parameters. In the event of failure, the digital power manager will shut down immediately, restart, or restart with time delay the power block(s) in accordance with specific priority determined by the failure causes to achieve the overall system protection. At the same time, the field information of the failure will be stored in the non-volatile memory (e.g., the flash) of the digital power manager for analysis afterwards.

5. PMBus Communication and the Graphical User Interface (GUI)

In order to realize the comprehensive management from the host computer to the multiple power blocks, the digital power manager which centralizes all power blocks information comprises a PMBus interface adapted to receive programming data from the host computer and send monitoring data thereto efficiently and in real time. The host computer comprises a graphical user interface (GUI) providing an interface for programming closed-loop control compensation parameters, thresholds of the protecting action, output voltage margining and sequencing and for monitoring, getting failure condition report of the multiple power blocks.

6. Boot Loader Function

The digital power manager has a non-volatile memory used to store data defining a firmware of the power system manager and reflecting filed information in the event of failure. New firmware of the control system required by the users can be upgraded through the PMBus in the field and it is called the boot loader function. The registers which contain firmware data can be divided into three segments: application registers, configuration registers and boot registers. Users can upgrade any of them through specific PMBus command. For security consideration, there are corresponding buffers in the non-volatile memory: application buffer, configuration buffer and boot buffer. After the new firmware has been downloaded into the buffers, it can be upgraded from the buffers into the registers immediately, after receiving upgrade command through PMBus or during the next power cycle according to different settings. The boot loader function will reduce development costs and cycle with the promise of ensuring system safe operation.

7. Mid Bus Converter with Monitoring Signals and Controllable Output Voltage

In applications where an on-board power system runs from a nominal source between 18 and 72 volts and also requires isolation, the use of a converter that generates an intermediate or "mid" bus is often used. In order to maximize the benefits of the digital control system in these applications, a mid bus converter that is controllable by the digital power system manager is used. This mid bus converter produces an output voltage that is reasonably fixed and set by the digital control system. The mid bus converter also provides signals that allow the digital controller to monitor the output and/or input current of the mid bus converter. This information can be used by the digital controller to optimize the mid bus voltage for best power conversion efficiency.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 12 and FIG. 13 are example screen shots depicting a GUI for programming different control configurations of the power blocks within the distributed power supply system respectively;

FIG. 14A and FIG. 14B are schematic diagrams of power systems exhibiting no communication between point-of-load converters and a converter that generates an intermediate DC voltage;

DETAILED DESCRIPTION

The present invention provides a digital power manager for controlling and monitoring power blocks within a distributed power supply system. In the detailed description that follows, like element numerals are used to describe like elements illustrated in the figures.

Figure 1:
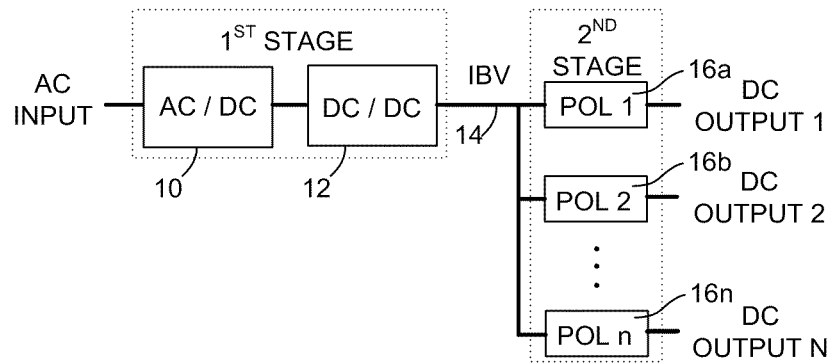
FIG. 1 is a block diagram of the distributed power supply system with intermediate bus.

Referring first to FIG. 1, in the first stage of the distributed power supply system, the AC input voltage is rectified by an isolated AD/DC converter (shown as AC/DC) 10, and then through an isolated DC/DC converter (DC/DC) 12, converted to a relatively low voltage rail, i.e., the intermediate bus voltage (IBV) (e.g., 12V) 14. In the second stage, there are multiple non-isolated point-of-load (POL) regulators (POL1-POLn) 16a-16n to convert the intermediate bus voltage 14 to each of multiple levels (shown as DC OUTPUT x) required by the electronic system. The POL regulators 16a-16n are preferably located close to respective loads to satisfy the system performance requirements.

Figure 2:
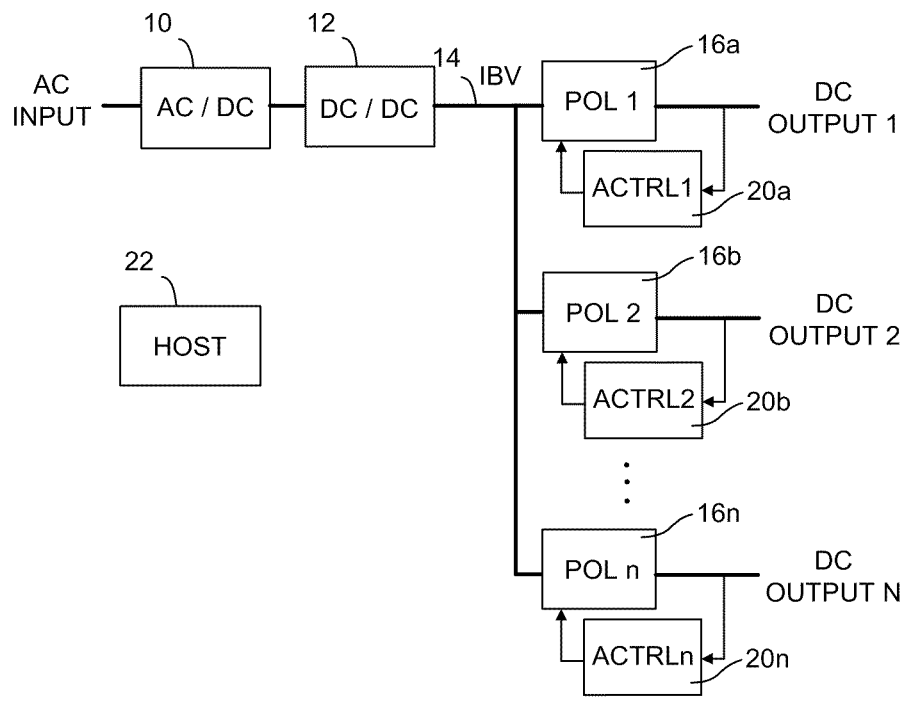
FIG. 2 is a block diagram of the distributed power supply system with analog control system.

FIG. 2 graphically depicts the configuration of the analog controlled distributed power supply system. Each of the plurality of POL regulators 16a-16n is under analog closed-loop control (ACTRL) 20a-20n. There is no way for the host user system (e.g., a host computer) 22 to obtain status of the POL regulators 16a-16n or to program their operation.

Figure 3:
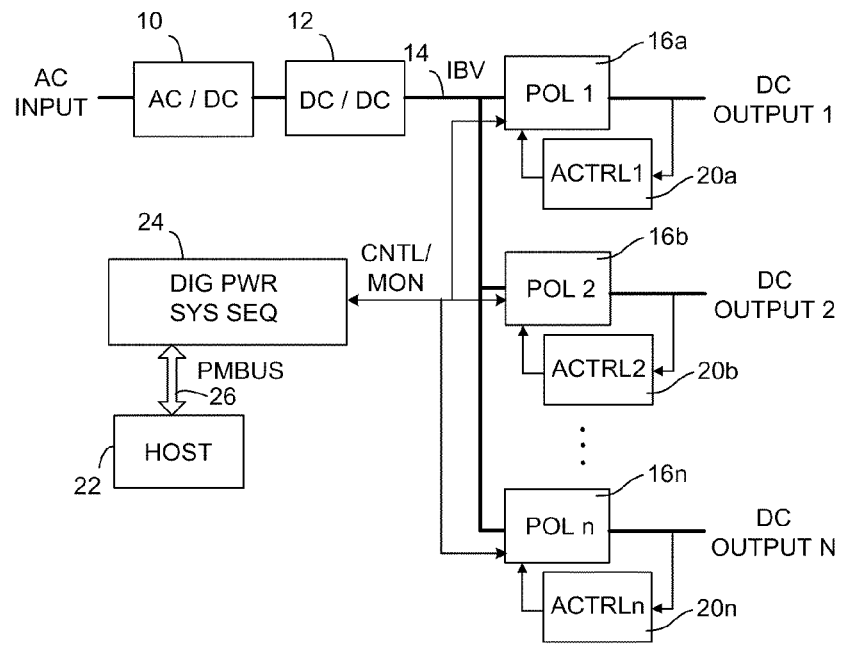
FIG. 3 is a block diagram of the distributed power supply system with digital power system sequencer.

FIG. 3 depicts the control system of the approach with a digital power system sequencer (DIG PWR SYS SEQ) 24 based on a digital signal processor (DSP) or micro control unit (MCU). The closed-loop control for each POL regulator is still realized by analog devices 20a-20n, and the digital power system sequencer 24 is capable of sensing status and programming operation of each POL regulator 16a-16n via various kinds of peripherals integrated on the DSP/MCU. The sequencer 24 can also communicate with the host computer 22 through power management bus (PMBus) 26 to realize the overall system control. The drawback of this control system is the inflexible closed-loop control.

Figure 4:
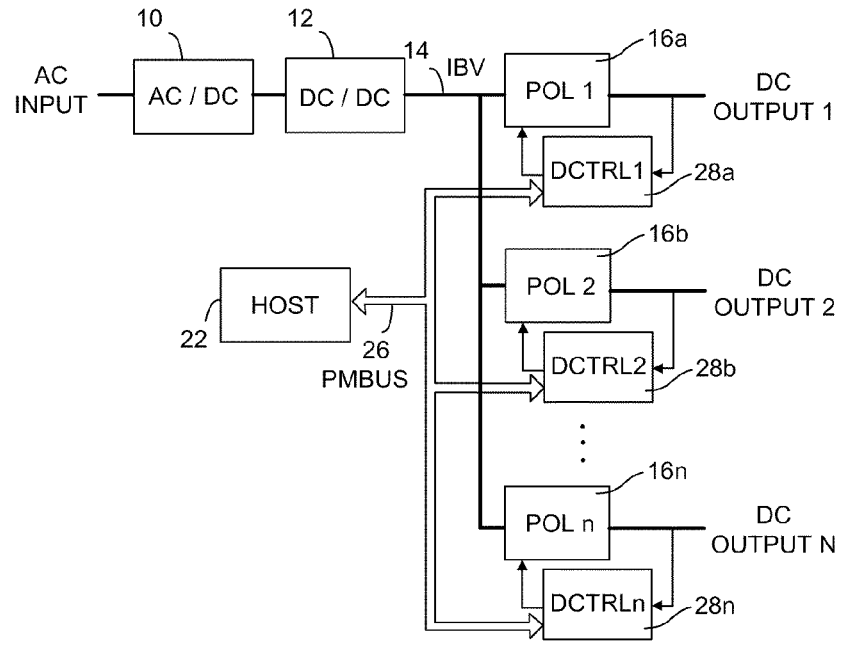
FIG. 4 is a block diagram of the distributed power supply system with multi-digital controllers.

FIG. 4 is a block diagram of the control system implementation with multiple digital controllers (DCTRL) 28a-28n. Each of the multiple digital controllers 28a-28n is responsible to a corresponding one of the POL regulators 16a-16n for closed-loop control and various protections. Additionally, as a slave device, each digital controller 28a-28n can have bidirectional communication with the host computer 22 through the PMBus 26. But there are too many digital devices in the system resulting in relatively high cost.

Figure 5:
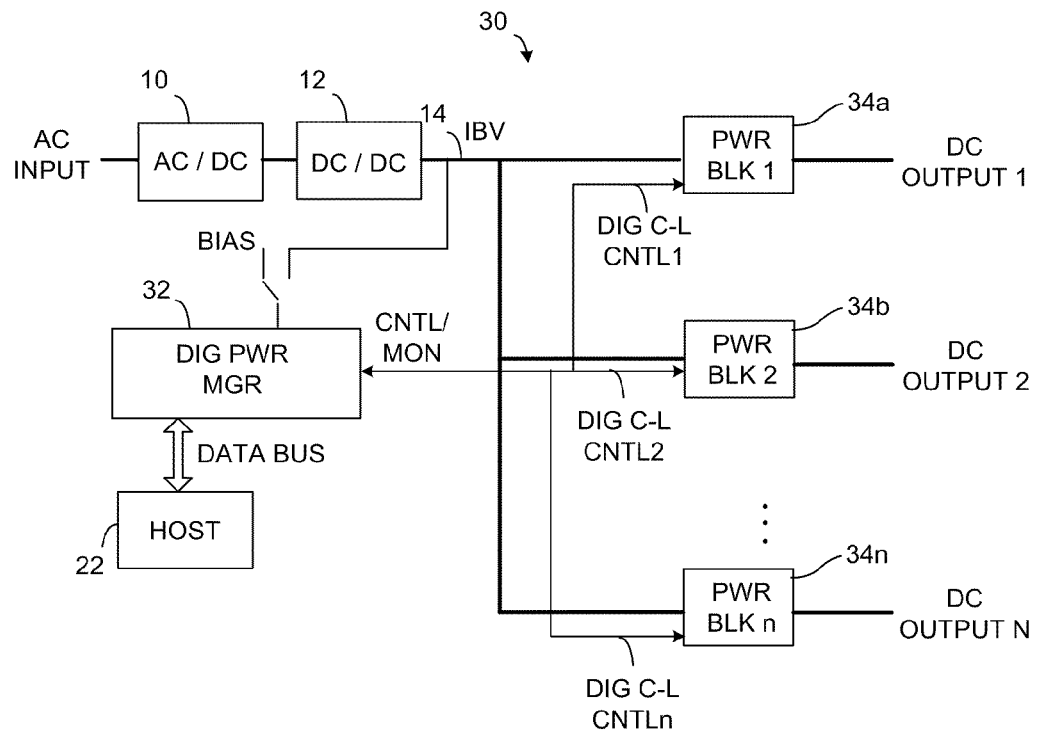
FIG. 5 is an example control configuration with a digital power manager for a plurality of power blocks within a distributed power supply system in accordance with an embodiment of the invention.

Referring to FIG. 5, a distributed power supply system 30 is shown in accordance with an embodiment of the present invention. The distributed power supply system 30 includes a digital power manager (shown as DIG PWR MGR) 32, a front-end isolated AC/DC converter 10, a front-end isolated DC/DC converter 12, and a plurality of power blocks 34a-34n. Digital closed-loop control (shown as DIG C-L CNTL) is provided to each power block 34 by the single digital power manager 32. Details of the closed-loop control are provided below.

The power blocks 34a-34n have only the power part of the conventional non-isolated DC/DC converters, without closed-loop control or protection circuits within themselves. The power blocks 34a-34n depicted herein include, but are not limited to, point-of-load regulators, power-on-load regulators, DC/DC converters, voltage regulators and all other programmable voltage or current regulating devices generally known to those skilled in the art. Each power block produces a required output voltage that is supplied to corresponding load. The power blocks may be individual or may be grouped depending upon the characteristics of the loads that are supplied in order to program advanced fault management schemes and define margining functions, monitoring, start-up behavior, and reporting conventions. It should be appreciated that the number of the power blocks in FIG. 5 is presented solely for example purposes, and that a greater or lesser number of power blocks could be advantageously utilized.

Figure 6:
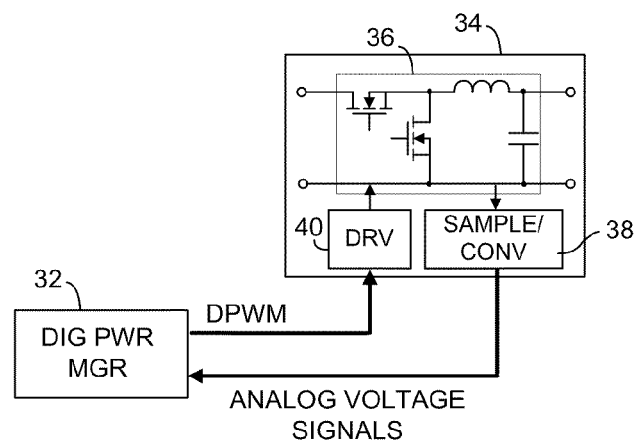
FIG. 6 graphically depicts an example structure of the power block and the connections between the digital power manager and the power block.

As shown in FIG. 6, the front-end AC/DC converter 10 draws power from an AC voltage source, and provides a DC voltage to the front-end DC/DC converter 12. The isolated DC/DC converter 12 regulates its input DC voltage to the intermediate bus voltage (IBV) 14 which is provided to the power blocks 34a-34n. The front-end AC/DC converter 10 or DC/DC converter 12 may comprise more than one regulator to obtain desired DC voltages. The digital power manager 32 draws its power from the intermediate voltage bus 14 or from a board bias voltage source (shown as BIAS). Alternatively, the front-end AC/DC converter 10 and the frond-end DC/DC converter 12 may provide a plurality of intermediate voltages to the power blocks over a plurality of intermediate voltage buses.

The digital power manager 32 communicates with a host user system 22 via a serial data bus (e.g., I2C) for programming, setting, and monitoring the distributed power supply system 30. The host user system may include a computer coupled to the I2C interface, either directly or through a network, having suitable software adapted to communicate with the digital power manager 32. As known in the art, the computer may be equipped with a graphics-based user interface (GUI) that incorporates movable windows, icons and a mouse, such as based on the Microsoft Windows® interface. The GUI may include standard preprogrammed formats for representing text and graphics, as generally understood in the art. Information received from the digital power manager 32 is displayed on the computer screen by the GUI, and the host user can program and monitor the operation of the distributed power supply system 30 by making changes on the particular screens of the GUI. The digital power manager 32 can be controlled via the GUI or directly via the I2C bus by using high and low level commands.

FIG. 6 graphically depicts an example structure of the power block 34 and the connections between the digital power manager 32 and the power block 34. Although depicted as a buck converter, the topology of the power block 34 may be buck, boost, buck-boost and so forth. Besides the power devices such as power switches, inductors, capacitors 36 and so on, the power block 34 comprises signal sampling and conversion circuits (SAMPLE/CONV) 38 which can sample the output voltage, output current, module temperature, etc. and convert them into analog voltage signals providing to the external digital power manager 32. A driving circuit (DRV) 40 on the power block 34 receives one or more pulse width modulation (PWM) signals from the digital power manager 32 to achieve power block output voltage closed-loop control and various protections.

Figure 7:
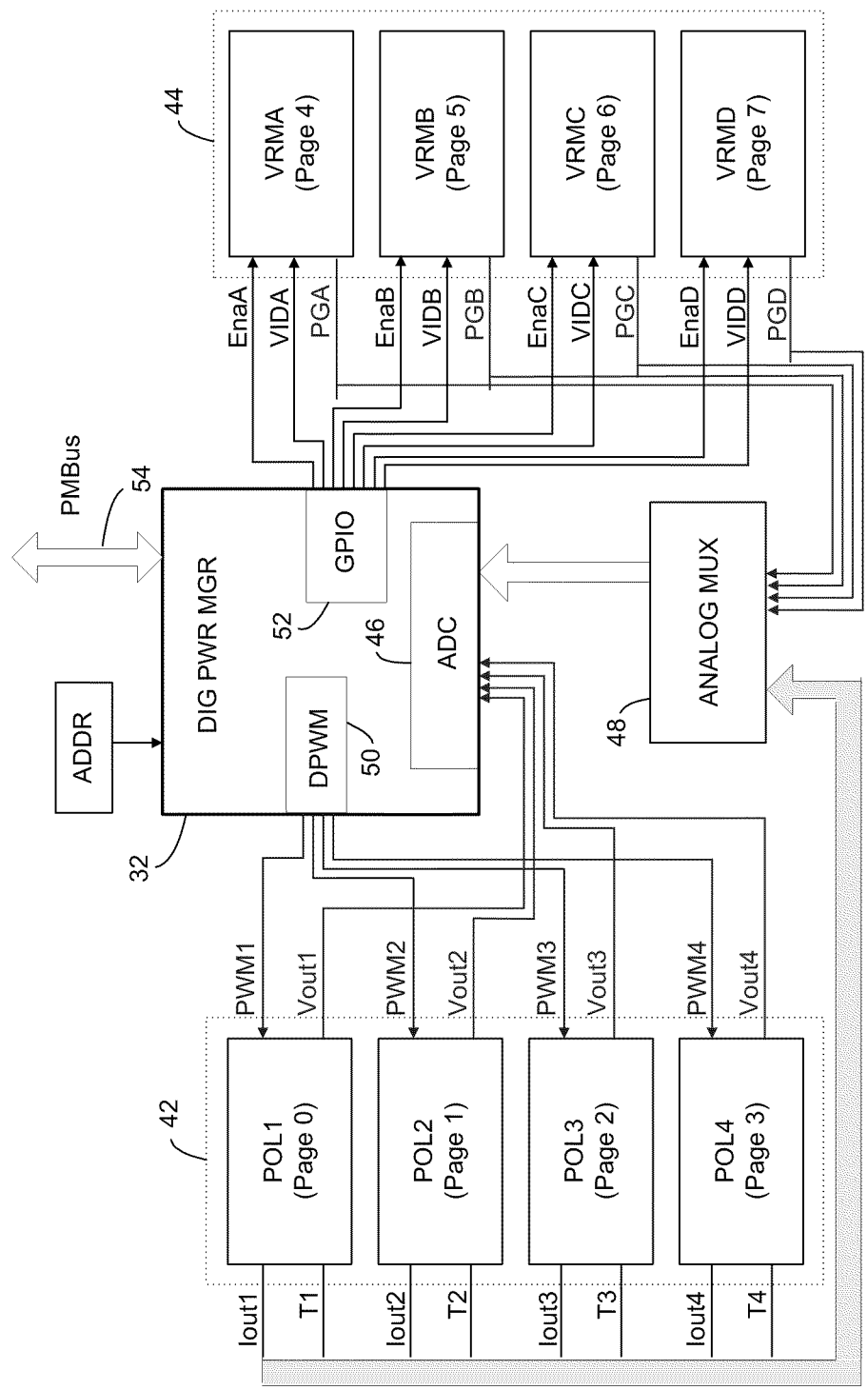
FIG. 7 is a block diagram of an example POL regulators/VRMs control system in accordance with an embodiment of the invention.

FIG. 7 is an example of a grouped power blocks control system in accordance with an embodiment of the present invention. As previously mentioned, the power blocks 34a-34n may be grouped depending upon the characteristics of the loads. In the embodiment of FIG. 7, there are two groups—one group of point-of-load (POL) regulators 42 and one group of voltage regulator modules (VRMs) 44. Although FIG. 7 shows two groups each having four components, there may be a greater or lesser number of groups and/or power blocks within each group in alternative embodiments.

The POL regulators 42 controlled by the digital power manager 32 are typical representatives of the power blocks 34, and the VRMs 44 (for which closed-loop control may be implemented by analog or digital devices) are also controlled by the digital power manager 32. The digital power manager 32 may be based on a digital signal processor (DSP) or micro control unit (MCU) with adequate peripherals and communication interfaces integrated in it. The signals presenting output voltage, output current, temperature, operating status etc. of the multiple power blocks (illustrated in FIG. 7 as the Vout1, Iout1, T1, PGA lines, etc., corresponding to each of the POL regulators and the VRMs) are sent into the digital power manager 32 via different analog-to-digital converter (ADC) channels 46 and/or general purpose input/output (GPIO) module 52 integrated in the digital power manager 32. If necessary, an analog multiplexer 48 may be utilized to introduce more sensing signals of the power blocks into the digital power manager 32. The pulse width modulation (PWM) signals, enable signals, and voltage identification definition (VID) signals (illustrated in FIG. 7 as the PWM1, EnaA, VIDA lines, etc., corresponding to each of the POL regulators and the VRMs) are generated from the digital pulse width modulator (DPWM) 50 and/or GPIO module 52 integrated in the digital power manager 32 to control the POL regulators and VRMs respectively. The PWM signals may be either synchronous or asynchronous as may be configured in the operating program of the digital power manager 32.

The digital power manager 32 uses a page-mode mechanism to control and monitor each power block 42, 44 within each group, identified in FIG. 7 as page 0, page 1, page 2, etc. Setting and monitoring parameters that are not specific to an individual power block are always available and can be sent and received across all pages. To set the parameters of a specific POL regulator 42 or VRM 44, and/or to read the sensing signals of a specific POL regulator 42 or VRM 44, a page pointer has to be set to point to the page corresponding to the POL regulator 42 or VRM 44 which is to be programmed and/or monitored. As also shown in FIG. 7, the digital power manager 32 has a unique user-programmable 7-bit address (ADDR) programmed by hardware or software to communicate with the host user system via a serial bus 54. The serial bus illustrated in FIG. 7 for example purposes is PMBus which is based on the open standard power management communication protocol.

Figure 8:
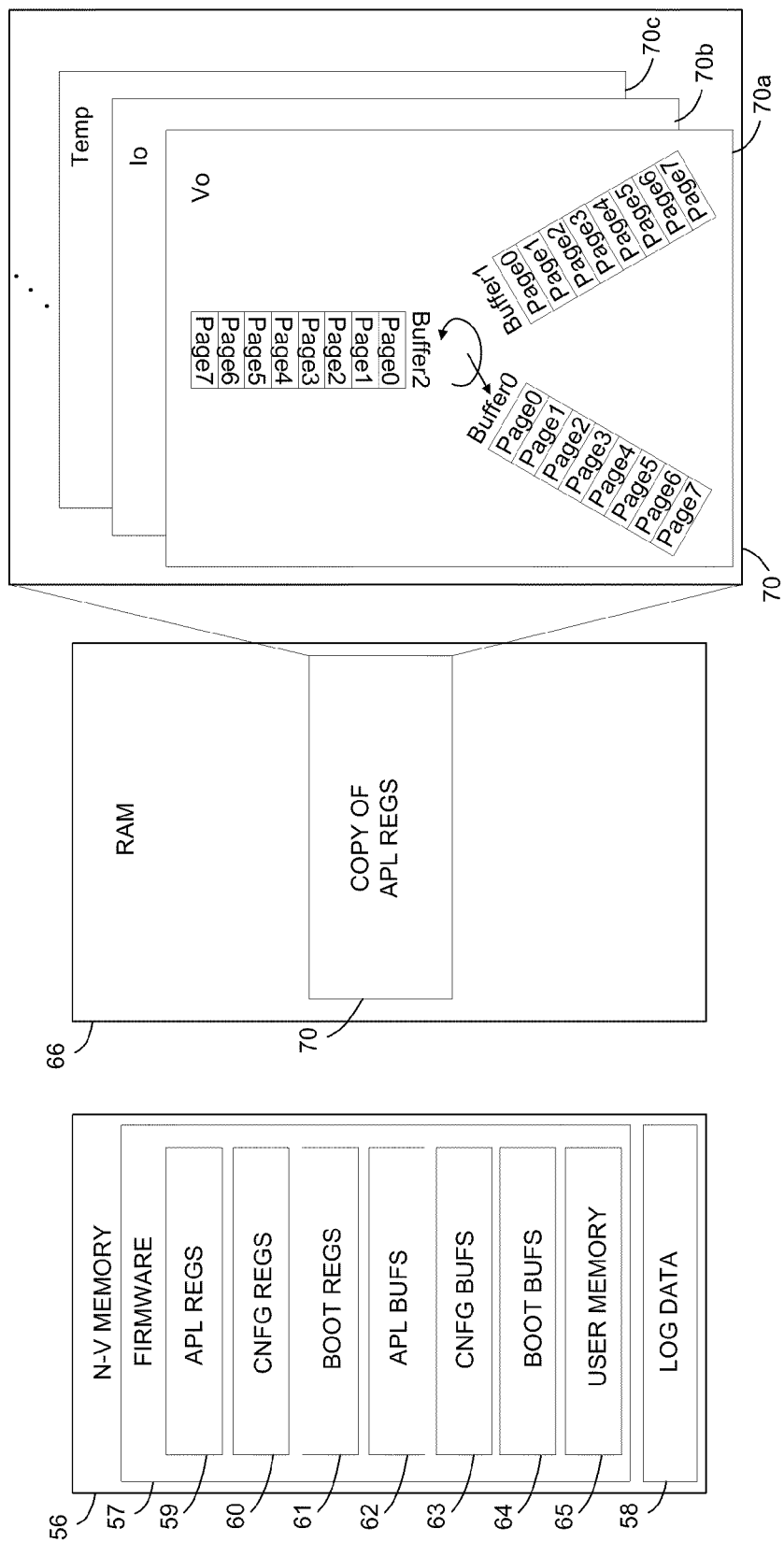
FIG. 8 is a block diagram depicting example partitioning of memory for the digital power manager.

FIG. 8 is a block diagram depicting example partitioning of memory for the digital power manager 32 based on the page mode shown in FIG. 7. The digital power manager 32 is coupled to two memory blocks, including a non-volatile (N-V) memory 56 (e.g., flash memory) and a random access memory (RAM) 66. The non-volatile memory 56 includes firmware data 57 and logging data 58 for failures that have occurred. The memory containing firmware data is segmented into several sections, including application registers 59, configuration registers 60, boot registers 61, application buffers 62, configuration registers 63, boot buffers 64, and user memory 65, which are described in turn.

The application registers 59 contain data values reflecting the programming of the individual POL regulators/VRMs such as output set points, output margining, output current thresholds, closed-loop compensation parameters, start up/shut down sequencing, VID codes, etc, and reflecting monitoring of operating conditions within individual POL regulators/VRMs such as the output voltages, output currents, modules temperatures, power good values, fault conditions, etc. The application registers 59 are grouped based on the page mode as illustrated in FIG. 7, and a page pointer is adapted to access specific page associated to a specific POL regulator or VRM.

The configuration registers 60 contain data values reflecting the programming of the digital power manager 32 and defines the configuration of the power system such as membership in a group and group configuration, fault propagation configuration, interrupt configuration, intermediate bus voltage high and low thresholds, software version, I2C address, etc.

The boot registers 61 contain data values reflecting base layer operating parameters of erasing/writing the non-volatile memory (e.g., flash) during booting.

The application buffers 62, configuration buffers 63 and boot buffers 64 contain new firmware data required by users which can be downloaded through PMBus. The data in the buffers can be moved into the application registers 59, configuration registers 60 and/or boot registers 61 in different manners according to users' settings.

The user memory 65 is a user-definable space that can be used to store user information such as system identification, dates of manufacture, location, application code version, etc.

The user can access the user memory 65 through the I2C interface. Upon start up, the configuration and programming data is written from the non-volatile memory 56 to the RAM 66, and the manager thereafter accesses the RAM to use the data. During normal operation, the monitoring data is stored in the RAM. In the event of failure, the latest monitoring data is logged into the non-volatile memory for analysis afterwards. This minimizes the number of read/write cycles of the non-volatile memory 56 to thereby increase its operational life.

In more detail, FIG. 8 shows a register block 70 in the RAM 66 containing a copy of the application registers 59 which consists of the monitoring data for run-time conditions of each POL regulators/VRMs, including output voltage (Vo) 70a, output current (Io) 70b, and temperature (T) 70c. There is a ring buffer of plural values (e.g., two). The parameters are continuously sampled and stored into the ring buffer with the oldest data being overwritten so that a running record of the last samples of the parameters is maintained. In case of system failure, the ring buffer will store data for plural monitoring cycles immediately, and set the associated fault flags. The running record in the RAM 66 will be logged into the non-volatile memory 56 preceding the power system shutdown.

Figure 9:
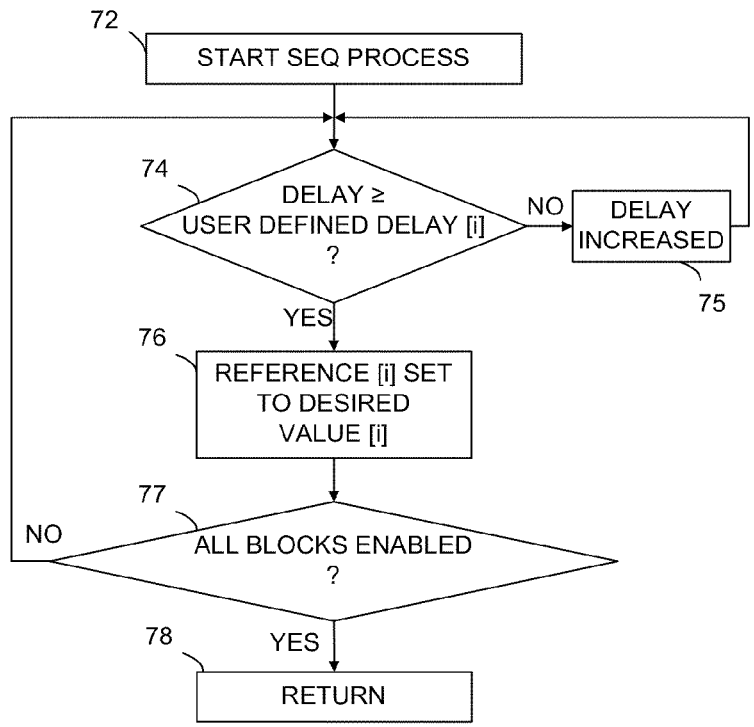
FIG. 9 is an example flow diagram of a process for performing start up sequencing of the power blocks.

FIG. 9 illustrates an example process 72 for programming start up sequencing of the power blocks. Sequencing is a function providing voltage to different loads in certain sequence according to the loads characteristics and application requirements. In an embodiment of the invention, the start up sequencing for a number of power blocks (e.g., eleven power blocks) (i.e., the delay time from control system start up instant to each power block start up instant) is set by the user through the GUI. Referring briefly to the screen illustrated in FIG. 12, an example of bit map and delay chart for start up sequencing setting up is shown. In this example, there are 12 POL regulators 42 and four VRMs 44. Eleven sequence entries (Sequence 1 through Sequence 11) are shown. Each entry includes a "1" in the column(s) of the power block(s) that should be on and a "0" for those to be off. Each sequence entry also includes respective user-defined delay (Delay 1 through Delay 11). The sequence entries are used to control the turn-on times of eleven power blocks as now described.

Returning to FIG. 9, initially all power blocks 34 are disabled and all the digital reference values of each power block for closed-loop control and the actual delay value are zero. At 72 a startup sequence is begun. Note that the subscript "i" is used in FIG. 9 as an index indentifying each successive sequence step.

Starting at step 74, the process enters a loop in which to determine whether each power block should be turned on immediately or later according to whether the delay since the last step has reached the corresponding user defined delay value from the sequence entry. If the actual delay is less than the user defined delay value, the delay value will be incremented at step 75, and then the loop repeated from step 74. Otherwise, the associated power block(s) will be enabled at step 76, which means the corresponding digital reference will be set to a desired operational value. Because all power blocks are constantly under closed-loop control, their output voltages are automatically adjusted in response to this setting of their digital reference values. At step 77, the sequencing process checks whether each of the power blocks has been enabled or not. If it is false, the process will continue to loop through step 74 until all power blocks are enabled and ends at step 78.

Figure 10:
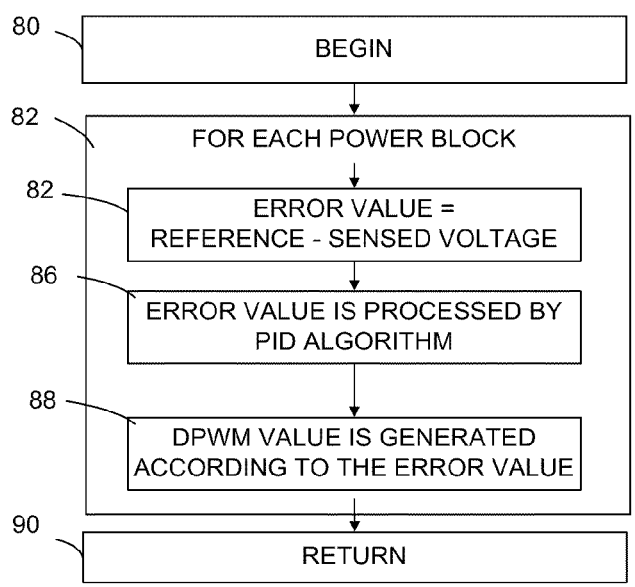
FIG. 10 is an example flow diagram of a process for closed-loop control in an interrupt service routine.

FIG. 10 is an example flow diagram of a process for closed-loop voltage control in an interrupt service routine (ISR) executed by the digital power manager 32. Once an interrupt event happens, the process will enter the corresponding ISR according to the interrupt source. In an embodiment of the invention, the process enters the closed-loop control ISR at step 80 when each analog-to-digital conversion is finished. The process next begins a major loop 82 that is repeated for each power block. At step 84, the process subtracts the digitized sensed output voltage from the digital reference value to get the error value. This error value which is processed by the proportional-integral-derivative (PID) control algorithm at step 86 will adjust the duty cycle generated from the digital pulse width modulator (DPWM) at step 88. Besides linear closed-loop control algorithm (e.g., PID algorithm), other control algorithms such as nonlinear or asynchronous control algorithm would be employed in other embodiments of the invention in order to improve static and/or dynamic performance. If each DPWM value for each power blocks respectively has been calculated, the closed-loop process ends at step 90.

Figure 11:
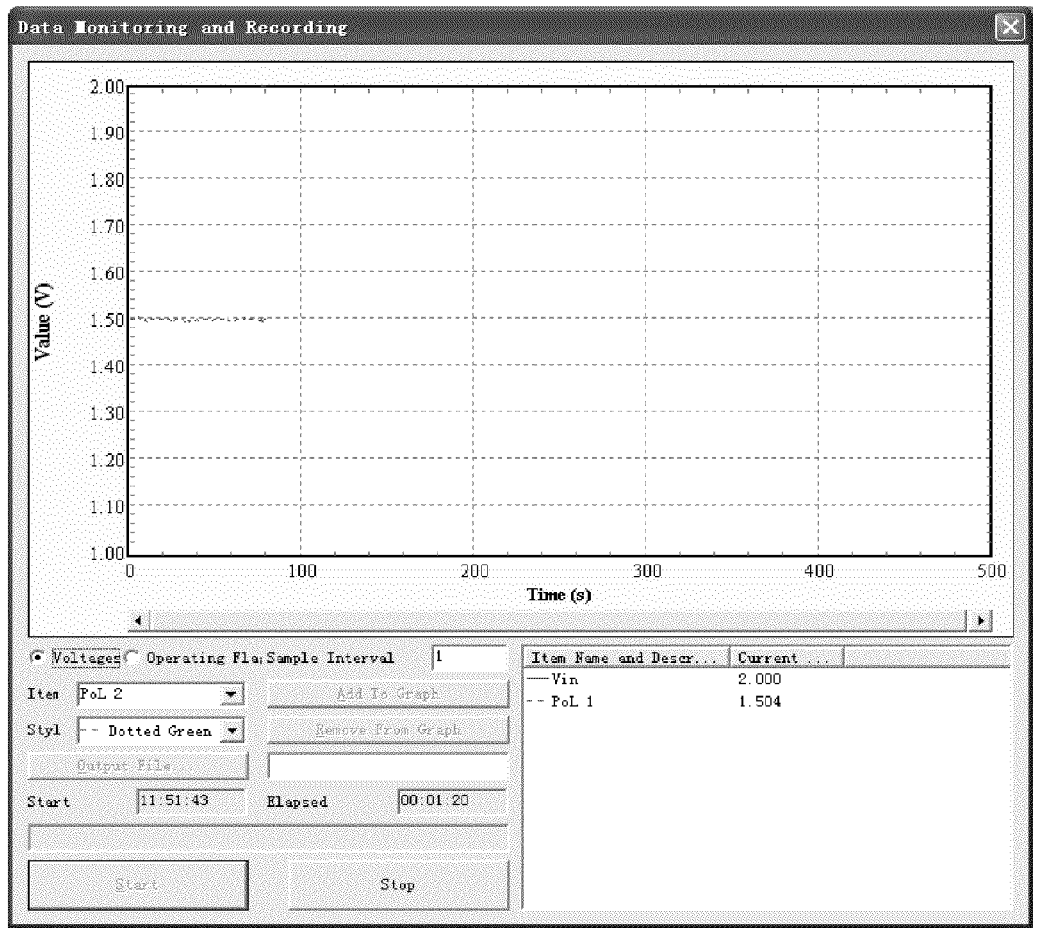
FIG. 11 is an example screen shot depicting a graphical user interface (GUI) for monitoring power blocks within a distributed power supply system.

FIG. 11 illustrates a GUI that enables the user to monitor performance of the power blocks. Using the GUI, the user can program the specific performance parameters of the power blocks that are desired to be monitored (e.g., voltages, operation flags), as well as the frequency of updating the monitoring data. And all parameter values could be displayed in a coordinate graph intuitively.

Figure 12:
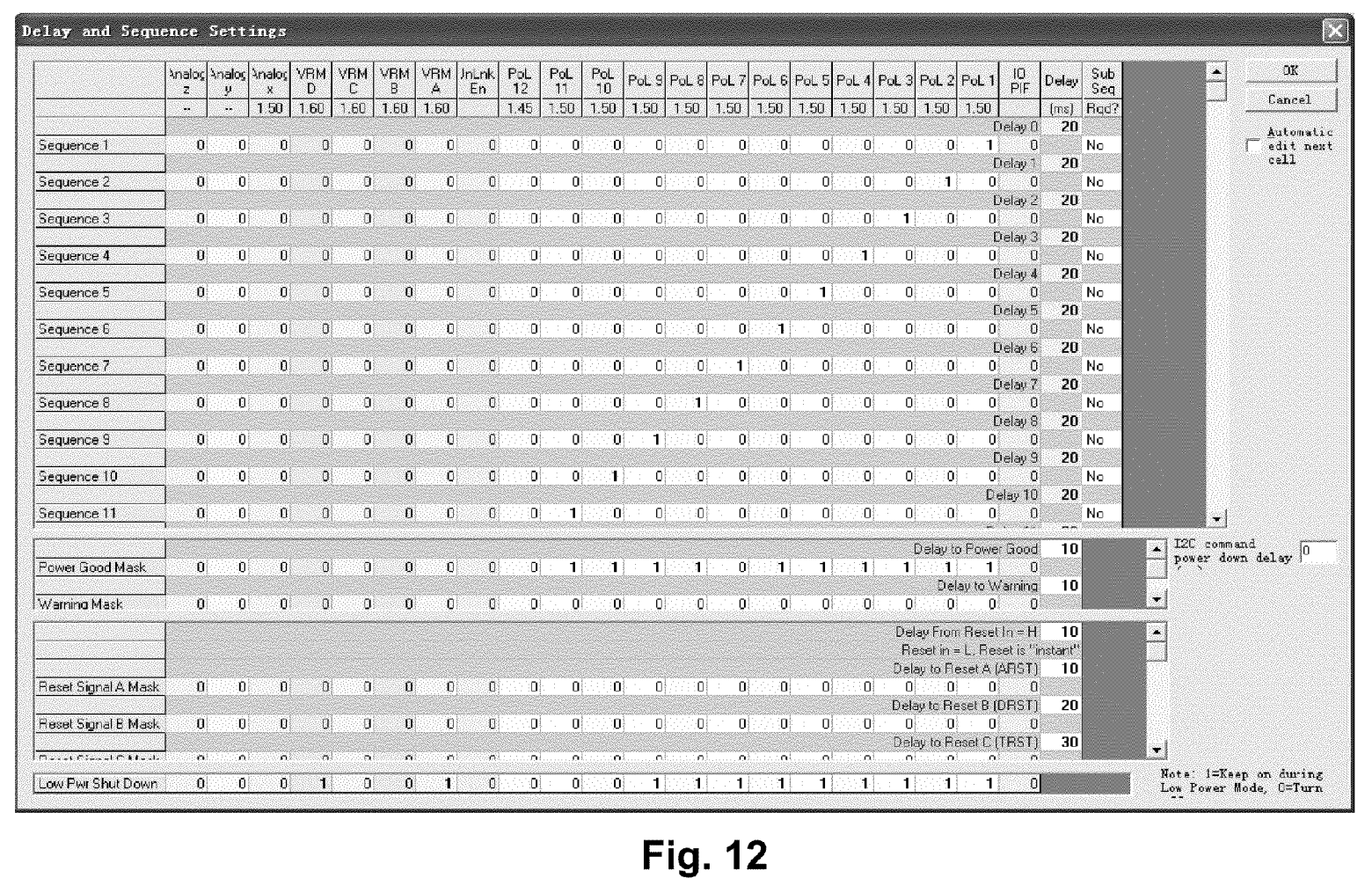
Figure 13:
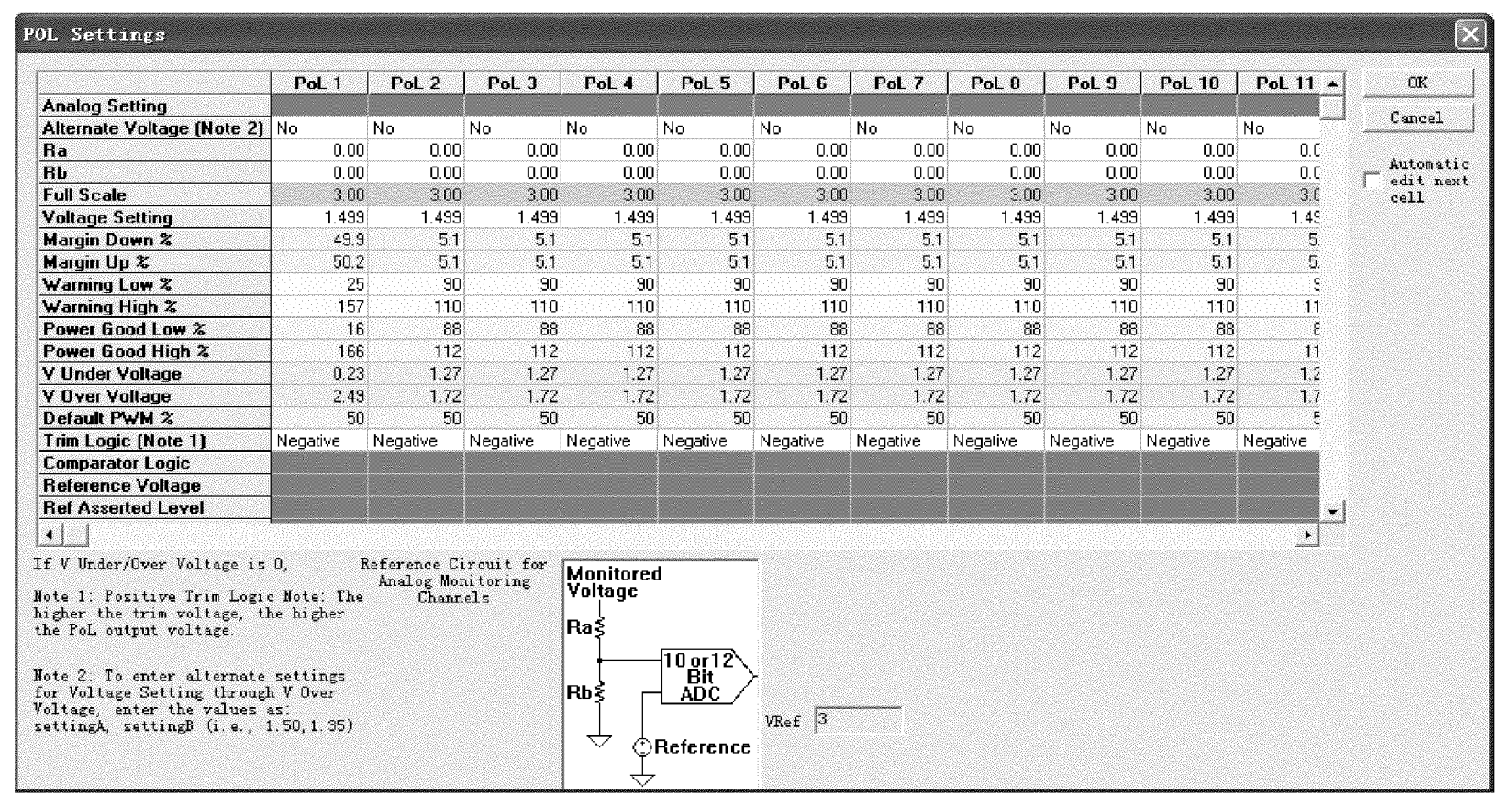

FIG. 12 and FIG. 13 are example screen shots depicting a GUI for programming control configuration for the power blocks. Using the GUI illustrated in FIG. 12, the user can program the start up sequencing of the multiple power blocks, as well as the checking power good and warning conditions sequencing, resetting sequencing and low power shutdown sequencing of the power blocks. A "1" in the bit maps to a given power block will attach that power block to the corresponding power good/warning checking, reset condition or low power shutdown with defined delay time; a "0" will ignore that power block for the specific signal. Using the GUI illustrated in FIG. 13, the user can program the output set point, margining configuration, warning and power good condition thresholds, sensing voltage scale, etc. of each power block.

FIGS. 14A-17 present an additional feature that can also be implemented using a digital power manager and can provide for more efficient operation of a distributed power system.

FIGS. 14A and 14B depict a general implementation of an on board power system. In both cases a DC bus is created (+VDC BUS) that is used to provide an input source to point of load (PoL) DC to DC converters 92. Each of the PoL converters 92 provides one or more regulated voltages and each voltage is delivered to an attached load. The regulated voltages provided by the PoL converters may be in the range of 500 mV to 5V for example. The +VDC BUS could be any voltage in some cases as low as 3.3V and in others as high as 400V. Voltages between 5V and 20V are generally practical and voltages between 9V and 18V are common. In FIG. 14A the +VDC BUS is derived by an isolated DC to DC converter 94 that takes its input from a DC source 96. The isolated DC to DC converter 94 produces the +VDC BUS. A control method that produces a regulated, semi regulated, or unregulated DC output may be used. Any of these control methods are valid as long as each of the attached PoL converters 92 can produce the desired regulated output voltage over the operating conditions of the isolated DC to DC converter 94.

FIG. 14B shows an arrangement similar to that of FIG. 14A except that the +VDC BUS is created from an AC to DC power supply 98 which receives its input from an AC mains supply 100. In both of these implementations there is no communication, analog or digital, between the power conversion device that generates the +VDC BUS and any of the PoL converters 92 that are attached to it.

An advantage of the centralized control approach as described herein (e.g., FIG. 5) is the ability to gather and process information pertaining to each of the PoL stages. If the same ability exists for the isolated input stage, it is then possible for the centralized controller to calculate operating parameters and make adjustments that optimize over all performance. One desired optimization would be overall power conversion efficiency.

Figure 15:
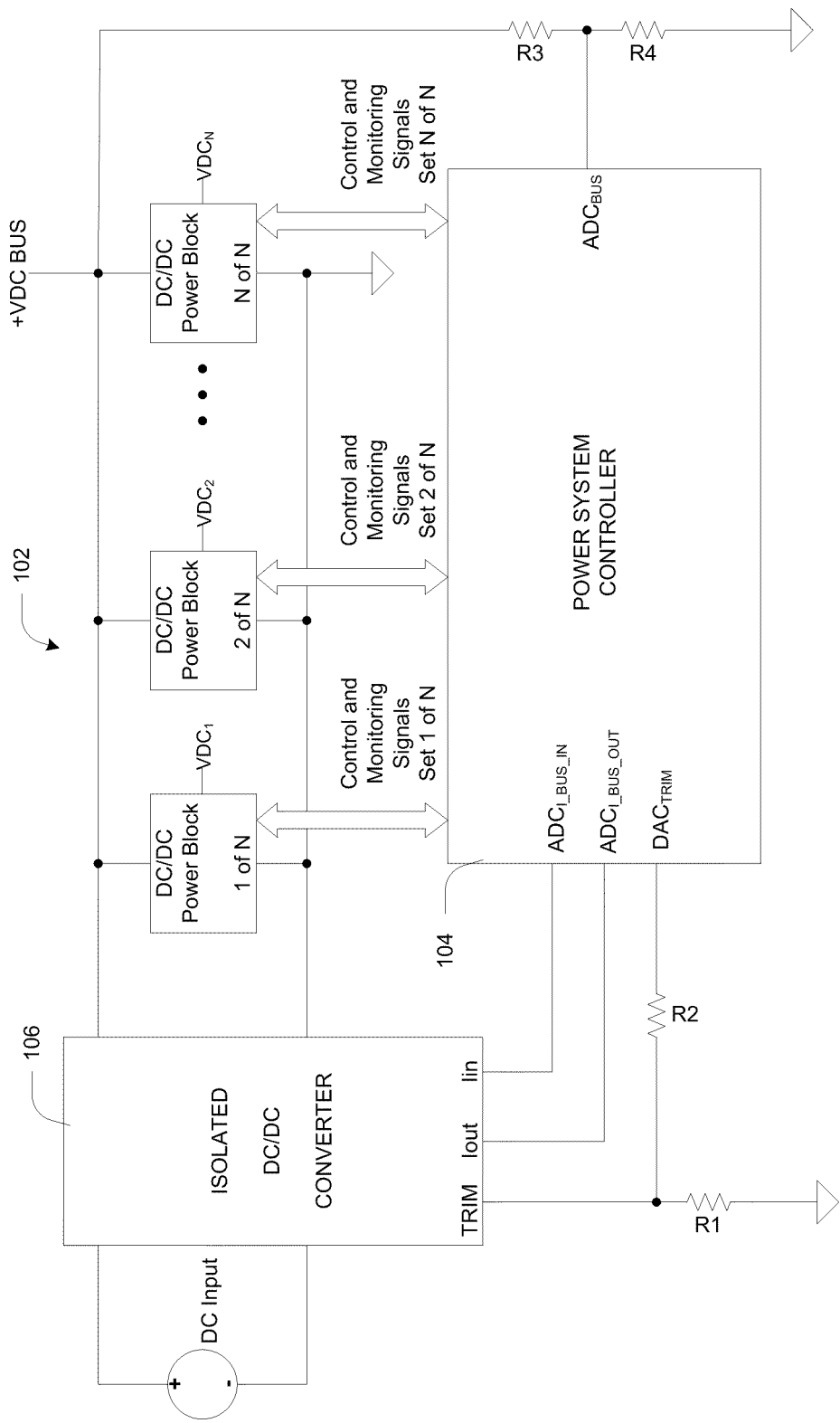
FIG. 15, FIG. 16 and FIG. 17 are schematic diagrams of alternative arrangements of power systems in which a digital power system controller communicates with the converter that generates the intermediate DC voltage.

FIG. 15 shows such a centralized control architecture. In this diagram the PoL converters 92 of FIGS. 14A and 14B are replaced by power blocks 102. The power blocks 102 provide power conversion that is controlled by a single digital power manager shown as power system controller 104. The power system controller 104 monitors each of the output voltages from the power blocks 102 and generates the required control signals to create regulated outputs from each of the power blocks 102, for example as described above. Each power block 102 has multiple connections to the power system controller 104 and includes signals that allow the power system controller 104 to gather operating information such as output current, output voltage, and operating temperature. It is possible for the power system controller 104 to determine the delivered output power of each of the power blocks 102 from these monitored signals. The output power results for each of the power blocks 102 can then be summed by the power system controller 104 to determine the total delivered power.

The system shown in FIG. 15 uses an isolated DC to DC converter 106 that allows additional monitoring and control by the power system controller 104. In this case analog monitoring outputs for input and output current are added to the isolated DC to DC converter 106 and connected to analog to digital conversion inputs on the power system controller 104. A digital to analog converter output on the power system controller 104 connects to a TRIM input on the isolated DC/DC converter 106 through a voltage divider consisting of R2 over R1. The input voltage to the power blocks 102 is also monitored by the power system controller 104 by a connection to an analog to digital converter input via the R3 over R4 voltage divider. The TRIM input on the isolated DC/DC converter 106 has the ability to adjust +VDC BUS voltage in proportion to the voltage applied to this pin. In this case the isolated DC/DC converter 106 could be of the regulated or semi-regulated type and the voltage on the TRIM pin would modify a reference value or feedback value in order to influence the delivered bus voltage. A measure of the current delivered to the +VDC BUS is also available to the power system controller 104, and by monitoring the +VDC BUS voltage itself the power system controller 104 has the means to calculate the power delivered to each of controlled power blocks 102.

With the additional monitoring and control elements described above, it is possible for the power system controller 104 to employ an efficiency optimization routine that optimizes the ratio of total delivered output power from the power blocks 102 to the power provided by the isolated DC/DC converter 106. This can be achieved by using the information to adjust the voltage delivered by the isolated DC to DC converter 106 to get the best possible conversion efficiency for the power system.

Figure 16:
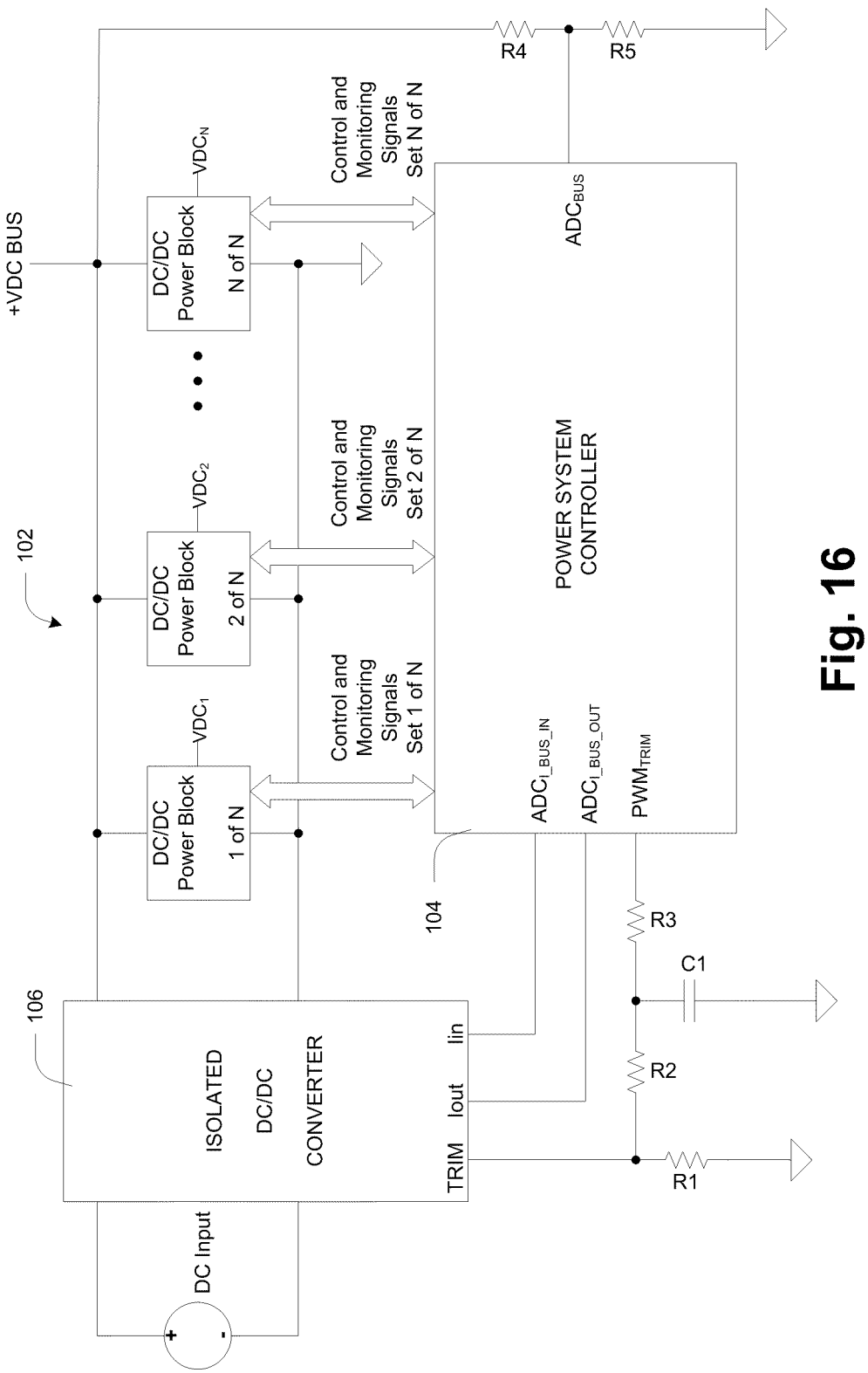

FIG. 16 illustrates another method of using the power system controller 104 to modify the voltage on the trim input of an isolated DC to DC converter 106. In this implementation a pulse width modulator generates a rectangular waveform with a duty cycle modified by the power system controller 104. A capacitor C1 is used for low-pass filtering and provides a DC voltage which is proportional to the average of the PWM signal determined by multiplying the PWM duty cycle and amplitude. The actual voltage delivered to TRIM pin is the average PWM value scaled by the voltage divider that is formed by the connections associated with R1, R2, and R3 as well as whatever impedance is presented by the TRIM pin circuitry internal to the isolated DC to DC converter 106. The low pass filter will not provide a perfect DC signal but the small amount of ripple voltage that exists will not have an adverse result on the performance of the system if C3 is sized appropriately.

Figure 17:
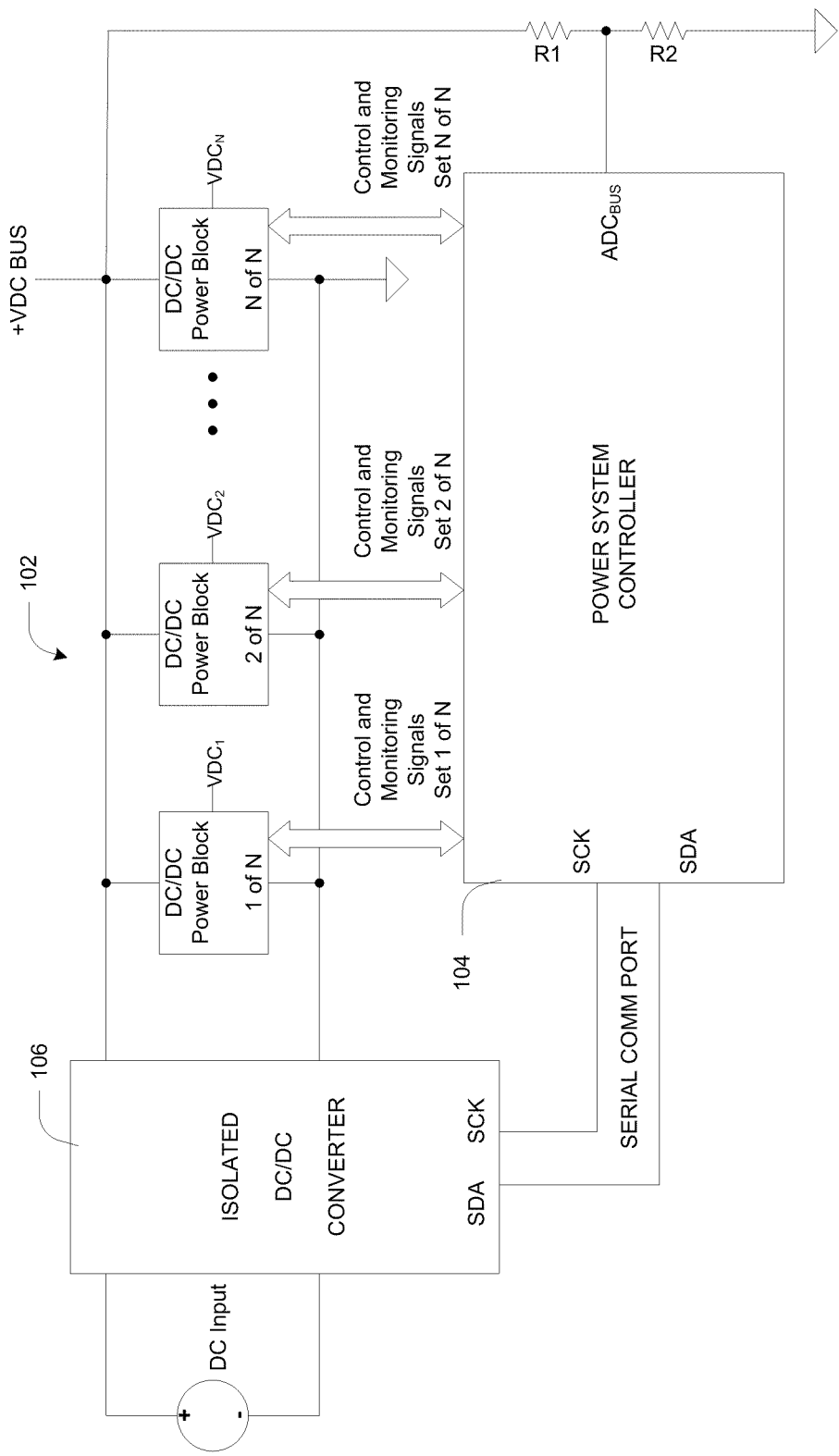

FIG. 17 shows another way to implement the additional communication required to realize the optimization features by means of a serial port between the power system controller 104 and the isolated DC to DC converter 106. This serial port consists of a clock (SCL) and data (SDA) line. The serial communication could be I2C or SPI. Clock and data lines are shown but these could also be replaced with a UART as well. When using serial communication either the power system controller 104 or the isolated DC/DC converter 106 could be the master (i.e., the device that initiates the communication protocol between the two devices). With this implementation the monitoring signals are digitized by the isolated DC to DC converter 106 for transmission to the power system controller, and analog to digital converter channels for this purpose are no longer needed. The isolated DC to DC converter 106 receives the trim information from the power system controller 104 through the serial bus as a digital word. If the isolated DC to DC converter 106 has an analog control scheme this value will be converted to an analog signal inside the isolated DC to DC converter 106. If the isolated DC to DC converter 106 uses a digital control method, such as duty cycle generated by a microcontroller, the isolated DC to DC converter 106 will simply process this digital word to obtain the desired trim result.

The efficiency optimization method described above is based on optimizing the ratio of delivered power to provided power for the DC to DC power system relative to the +VDC BUS. However, if an additional signal is provided to the power system controller 106 that represents the voltage at the DC source input it would also be possible to provide this optimization for the total power conversion from source to load.

FIGS. 15, 16 and 17 show an isolated DC to DC converter as the means of generating the +VDC BUS however, similar control features could be implemented in an AC to DC power supply to achieve a similar purpose.

In another implementation of the isolated DC to DC converter an input feed forward technique could be applied. In most switching DC to DC converters an approximation of output voltage is a function of applied input voltage and switching duty cycle or applied input voltage and switching frequency. If very tight regulation as a function of delivered output current is not required, which is the case for the power system as shown, one could simply get an approximate output voltage by adjusting either of the applicable control parameters, duty cycle or frequency, in relation to the value of the applied source voltage. In this implementation it is possible to use the TRIM pin to influence the relationship of either of these possible control parameters in relation to the applied source voltage. This implementation will modify the delivered bus voltage in relation to the voltage applied to the trim pin. This also holds true if the trim information is delivered by a digital serial bus and processed as digital information to achieve the same means.

While various embodiments of the invention have been particularly shown and described, it will be understood by those skilled in the art that various changes in form and details may be made therein without departing from the spirit and scope of the invention as defined by the appended claims.

What is claimed is:

1. A power supply system, comprising:
    a plurality of power blocks, each power block adapted to convey power to a respective load responsive to a respective pulse width modulation (PWM) control signal; and
    a digital power manager adapted to (1) program operating parameters and receive monitoring data of said plurality of power blocks using input/output circuitry integrated in said digital power manager, and (2) generate the PWM control signals of all the power blocks in response to said monitoring data so as to implement closed-loop control of the power conveyed by each of said plurality of power blocks,
wherein said digital power manager further comprises a non-volatile memory containing a plurality of registers, said plurality of registers including:
an application register containing data values (1) programming operation of said power blocks and (2) monitoring state of said power blocks;
a configuration register containing data values defining a configuration of said power supply system;
a boot register containing data values reflecting base layer operation to said non-volatile memory;
buffers including an application buffer, a configuration buffer, and a boot buffer containing new firmware data;
a user-definable space; and
a logging data space containing field information in the event of failure.

2. The power supply system of claim 1, wherein said power blocks include a power part of non-isolated DC/DC converters, signal sampling and conversion circuits, and driving circuits.

3. The power supply system of claim 1, wherein said digital power manager comprises an analog-to-digital converter (ADC), a digital pulse width modulator (DPWM), general purpose input/output interfaces, and a central processing unit (CPU).

4. The power supply system of claim 1, wherein said operating parameters include output voltage set point, sequencing, fault propagation configuration, and margining, and said monitoring data includes input voltage, output voltage, output current, and temperature.

5. The power supply system of claim 1, wherein said digital power manager further comprises a user interface adapted to receive programming data and send said monitoring data.

6. The power supply system of claim 5, wherein said user interface further comprises an I2C interface.

7. The power supply system of claim 1, further comprising a host user system coupled to said digital power manager, said the host user system further comprises a graphical user interface providing programming of said operating parameters and monitoring said monitoring data of each of said plurality of power blocks.

8. The power supply system of claim 1, wherein said digital power manager is adapted to perform a respective closed-loop voltage control process for each of the power blocks, each closed-loop voltage control process including:
calculating an error value as the difference between a reference value and a sense voltage representing an output voltage of the respective power block;
processing the error value to generate a processed error value; and
generating the PWM control signal for the respective power block based on the processed error value.

9. The power supply system of claim 8, wherein processing the error value includes executing an algorithm selected from a proportional-integral-derivative (PID) algorithm, a non-linear algorithm, a hysteretic algorithm, and an asynchronous algorithm.

10. The power supply system of claim 8, wherein said processing also includes processing of a sensed average/peak output current of each of the power blocks to realize closed-loop current control and/or closed-loop power control.

11. The power supply system of claim 1, further including a converter circuit operative to supply an intermediate bus voltage to each of the power blocks, and wherein said digital power manager is operative in response to said monitoring data of the power blocks and information representing power supplied by the converter circuit to control the intermediate bus voltage from the converter circuit to achieve a desired conversion efficiency of the power supply system.

12. A power supply system, comprising:
a plurality of power blocks, each power block adapted to draw power from an intermediate power bus and to convey power to a respective load;
a converter circuit operative in response to a voltage control signal to supply the power to the intermediate power bus at an intermediate bus voltage corresponding to the voltage control signal; and
a digital power manager adapted to (1) program operating parameters and receive monitoring data of said plurality of power blocks using input/output circuitry integrated in said digital power manager, and (2) generate the voltage control signal in response to said monitoring data of the power blocks and information representing power supplied by the converter circuit so as to control the intermediate bus voltage to achieve a desired conversion efficiency of the power supply system.

13. The power supply system of claim 12, wherein the digital power manager generates a discrete analog control signal supplied to the converter circuit to control the intermediate bus voltage generated by the converter circuit, the discrete analog control signal having an analog value representing a desired output voltage of the converter circuit and being used by the converter circuit to adjust its output voltage to the desired output voltage.

14. The power supply system of claim 12, wherein a digital communications bus connects the digital power manager to the converter circuit and is used by the digital power manager to control the intermediate bus voltage generated by the converter circuit.

15. The power supply system of claim 12, wherein the digital power manager is configured and operative to execute an efficiency optimization routine that achieves a desired ratio of total delivered output power from the power blocks to the power provided by the converter circuit.

16. The power supply system of claim 12, wherein the digital power manager receives a signal representing a voltage at a source input and is configured and operative to execute an efficiency optimization routine that achieves a desired ratio of total delivered output power from the power blocks to input power provided to the power supply system.

17. The power supply system of claim 16, wherein the efficiency optimization routine includes an input feed forward technique based on an approximation of output voltage as a function of applied input voltage and either switching duty cycle or switching frequency, the input feed forward technique including adjusting either switching duty cycle or switching frequency in relation to the applied input voltage to modify the intermediate bus voltage to achieve the desired ratio of total delivered output power from the power blocks to input power provided to the power supply system.

18. The power supply system of claim 12, wherein each power block has multiple connections to the digital power manager for signals including output current, output voltage, and operating temperature of the power block, and wherein the digital power manager is configured and operative to use the signals to calculate output power delivered from each of the power blocks and to sum the respective output powers of the power blocks to determine the total delivered output power.

19. The power supply system of claim 12 including connections and respective signals between the converter circuit and digital power manager for monitoring and control of the converter circuit by the digital power manager, the signals including a trim control signal controlling the intermediate bus voltage in proportion to a voltage of the trim control signal, the signals further including a current signal providing a measure of current delivered by the converter circuit to the intermediate bus.

20. The power supply system of claim 1, including a serial digital communications link between the digital power manager and the converter circuit, and wherein monitoring and control signals are conveyed as corresponding digital values carried on the serial digital communications link.

* * * * *